United States Patent [19]
Griffin

[11] Patent Number: 5,562,166
[45] Date of Patent: Oct. 8, 1996

[54] GARDEN TILLER

[76] Inventor: Billy G. Griffin, Rte. 2, Box 224, Coushatta, La. 71019

[21] Appl. No.: 440,835

[22] Filed: May 15, 1995

[51] Int. Cl.⁶ ................................ A01B 33/02
[52] U.S. Cl. .................. 172/42; 172/107; 172/273; 172/274; 172/810; 172/351; 172/433; 172/103
[58] Field of Search ............ 172/42, 273, 274, 172/810, 351, 370, 433, 107, 103; 56/11.6

[56] References Cited

U.S. PATENT DOCUMENTS

| | | | |
|---|---|---|---|
| 1,661,122 | 2/1928 | King | 172/42 X |
| 2,620,612 | 12/1952 | De Eugenio | 56/11.6 |
| 2,701,616 | 2/1955 | Cooper | 172/42 X |
| 2,776,533 | 1/1957 | Yacoby | 172/42 X |
| 2,899,793 | 8/1959 | Swisher | 56/11.6 |
| 2,980,443 | 4/1961 | Fina, Jr. | 172/810 X |
| 3,003,574 | 10/1961 | Strunk | 56/11.6 X |
| 3,052,077 | 9/1962 | Gustafson et al. | 56/11.6 |
| 3,123,961 | 3/1964 | Kamlukin | 56/11.6 |
| 3,628,315 | 12/1971 | Bartholomew | 56/11.6 X |
| 3,792,734 | 2/1974 | Ellis et al. | 172/43 |
| 4,066,131 | 1/1978 | Zandberren | 172/680 |
| 4,260,027 | 4/1981 | Langan | 172/810 X |
| 4,408,683 | 10/1983 | Elmy et al. | 56/11.6 X |
| 4,454,706 | 6/1984 | Geeck, III | 56/11.6 X |
| 4,560,046 | 12/1985 | Lorello et al. | 56/11.6 X |
| 4,813,215 | 3/1989 | Chase et al. | 56/11.6 |
| 4,817,728 | 4/1989 | Schmid et al. | 172/810 X |
| 4,844,175 | 7/1989 | Nations | 172/274 X |
| 5,064,338 | 11/1991 | Lawrence | 414/685 |
| 5,078,216 | 1/1992 | Dick | 172/117 |

FOREIGN PATENT DOCUMENTS

| | | | |
|---|---|---|---|
| 2502278 | 7/1975 | Germany | 172/433 |
| 624520 | 9/1961 | Italy | 172/433 |

OTHER PUBLICATIONS

Ariens "Mowers Tillers Tractors" Brochure, 1985.
Gravely "Power vs. Drudgery" Brochure, Jan., 1960.

*Primary Examiner*—Terry Lee Melius
*Assistant Examiner*—Christopher J. Novosad

[57] ABSTRACT

The invention is the combination of a motor powered garden tiller connected to a separate motor driven chassis which includes a seat for an operator to control the tiller. The speed of the tiller is controlled by and through the articulated coupler between the tiller and the chassis.

2 Claims, 4 Drawing Sheets

GARDEN TILLER

BACKGROUND OF THE INVENTION

1. Field of the Invention

This invention relates generally to garden tillers and more particularly to a dual powered tiller unit.

2. Description of the prior art

U.S. Pat. No. 3,792,734 issued Feb. 19, 1974 to Ellis et al for a self-propelled tiller that includes front mounted tines connected to a motor and a pair of wheels mounted by pivotal links to a frame supporting the motor and a pair or rearwardly extending handles. The position of the wheels is adjustable via links connected to the handles. The wheels are appropriately positioned to allow the tines to propell the tiller when not engaged in actual tilling.

U.S. Pat. No. 4,066,131 issued Jan. 3, 1978 to Zandbergen discloses a hitch assembly for detacahably connecting an independently operable rotary ground tiller to the rear of a garden tractor for towed operation and includes remote tiller clutch and tilling depth controls-within reach of the tractor operator.

U.S. Pat. No. 5,064,338 issued Nov. 12, 1991 to Lawrence discloses an implement mounting apparatus for tractors and mowers. The apparatus is adapted for use with lawn and garden tractors and allows for removable mounting and use of numerous attachments for performing lawn and garden functions. The apparatus includes a support frame with provision for attachment of various tools and equipment.

U.S. Pat. No. 5,078,216 issued Jan. 7, 1992 to Dick for a combination tillage apparatus. The invention disclosed includes a frame towed behind a farm tractor containing an assortment of various tilling equipment, allowing a number of tillage operations to be performed in a single pass over the soil rather than multiple passes and performing a singular operation at each pass.

The prior art as commonly known and the references cited above taken alone or in combination fail to anticipate the invention as disclose and claimed herein.

SUMMARY OF THE INVENTION

The invention is characterized by a garden tiller having a frame, front mounted tines, a motor for rotating the tines mounted on the frame and handles connected to the frame that extend to the rear in a normal and conventional manner. Coupled to the rear of the frame is a power driven chassis frame. The chassis has an operator's seat mounted over a driving axle. A motor is mounted behind the seat and is connected by a clutch controlled belt drive through a transmission to the wheels of the driving axle. The coupler connecting the chassis to the frame is articulated and allows the operator turn the tiller with the handles while remaining seated on the chassis. To transport the tiller the operator pulls the handles down, raising the tines and the combination tiller and chassis is driven by the motor in the chassis. In addition the coupler allows the chassis to control the speed of the tiller. In the event the tiller becomes bogged down in heavy soil the chassis motor will act to push the tiller ahead, alternatively if the tiller is moving forward too fast the chassis motor will retard the forward movement while the tine speed remains constant.

Tiller operation can be exhausting and difficult work, in particular in soil that is hard, rocky or not previously tilled. The invention disclosed herein allows the tiller operator to perform all the necessary operations to run the tiller but provides relief from the shock and vibration that accompanies the process of tilling as well as the need to walk through the soft, uneven soil behind the tiller.

It is therefore an object of the invention to provide an new and improved garden tiller.

It is another object of the invention to provide a new and improved garden tiller that substantially reduces operator fatigue in garden tilling operations.

It is a further object of the invention to provide a new and improved garden tiller that is easier to operate than other known similar tillers.

It is still another object of the invention to provide a new and improved garden tiller that controls that is forward speed controlled.

It is still a further object of the invention to provide a new and improved garden tiller that is of a durable and reliable construction.

It is another object of the invention to provide an new and improved garden tiller which may be easily and efficiently manufactured and marketed.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference tot eh annexed drawings wherein.

DETAILED DESCRIPTION OF A PREFERRED EMBODIMENT

Figure 1:
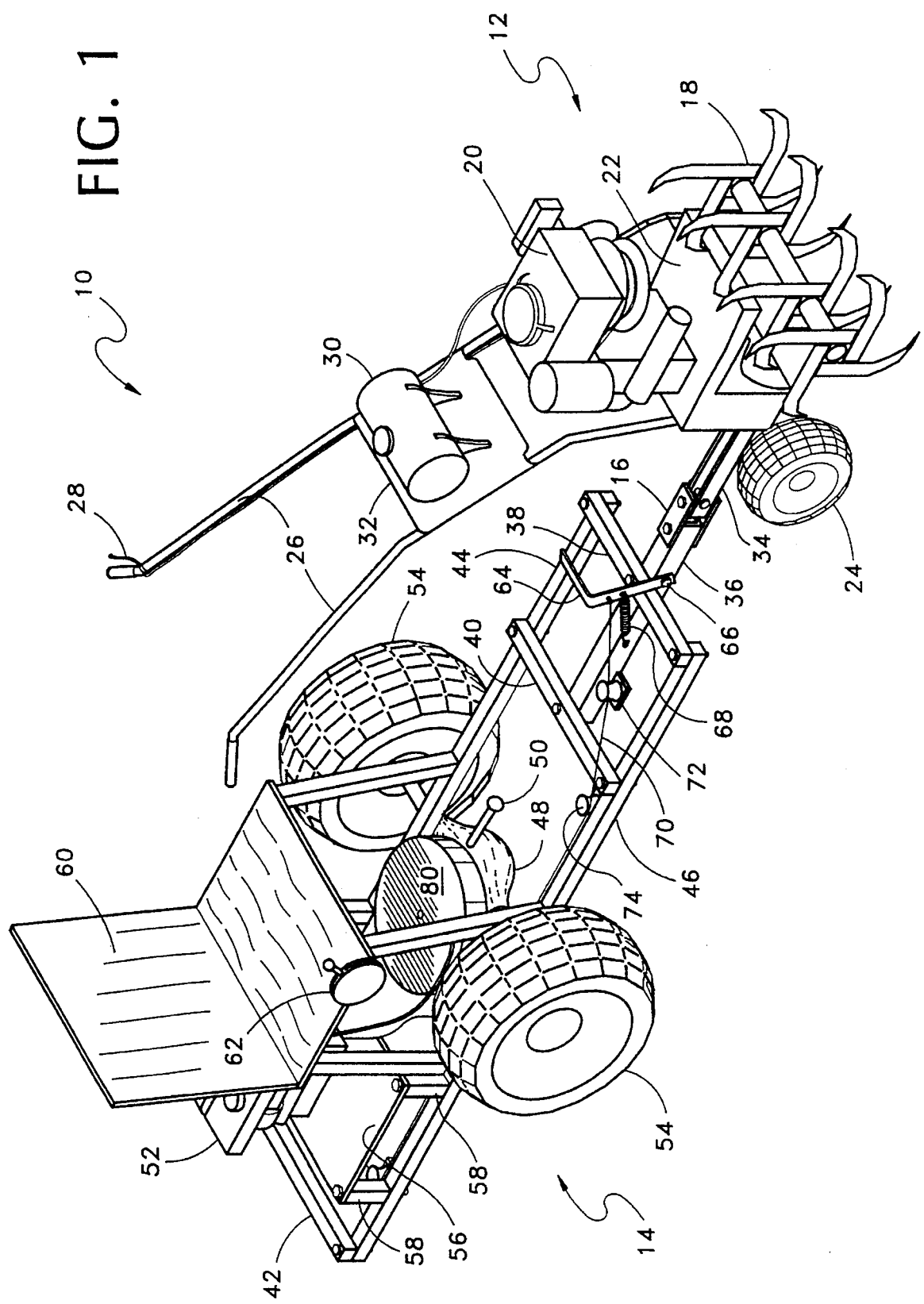
FIG. 1 is a perspective view of the improved tiller and chassis of the invention.

Referring now to FIG. 1, the invention is shown generally at 10 and consists of a garden tiller shown generally at 12 and a chassis shown generally at 14 coupled in an articulated fashion by the coupler 16. The tiller is conventional in form consisting of front mounted rotating tines 18 driven by a motor 20 mounted on a frame 22. A pair of wheels 24 mounted on opposed sides of the frame facilitate movement of the tiller when not engaged in the tilling process. Handles 26 attached to the rear of the frame are utilized to control the operation and direction of the tiller. A tiller clutch control 28 is mounted on the handle to facilitate the control and operation of the machine. A tiller motor fuel tank 30 is mounted on a plate 32 that also supports and stabilizes tiller handles 26. Extending from rear of the frame 22 is a bar 34 which connects to a cooperating bar 36 attached to chassis through coupling 16.

Chassis 14 includes cross members 38,40 and 42 connecting side rails 44,46. The side rails rest on and are connected to trans axle 48 which includes a multiple speed transmission controlled by shift lever 50. The trans axle transmits power from the motor 52 to the wheels 54. The motor 52 is attached to a mounting plate 56 which is bolted at its four corners 58 to the side rails 44,46. The motor is connected to the trans axle by a drive belt as will be disclosed hereinafter. A seat 60 is provided for the operator. A throttle control mechanism 62 is attached to the seat and allows the operator to control the forward speed of the chassis and the tiller. A clutch pedal 64 is pivotally connected to the tubular steel bar 36 by a bolt 66. The pedal is biased against cross member 38 by spring 68. A cable 70 is attached to a clutch for controlling the motion of the chassis through a series of pulleys including pulleys 72,74. It is intended that the operator sit in the seat 60, place his hands on the handles 26 and rest his feet on the cross member 38 when operating the tiller.

Figure 2:
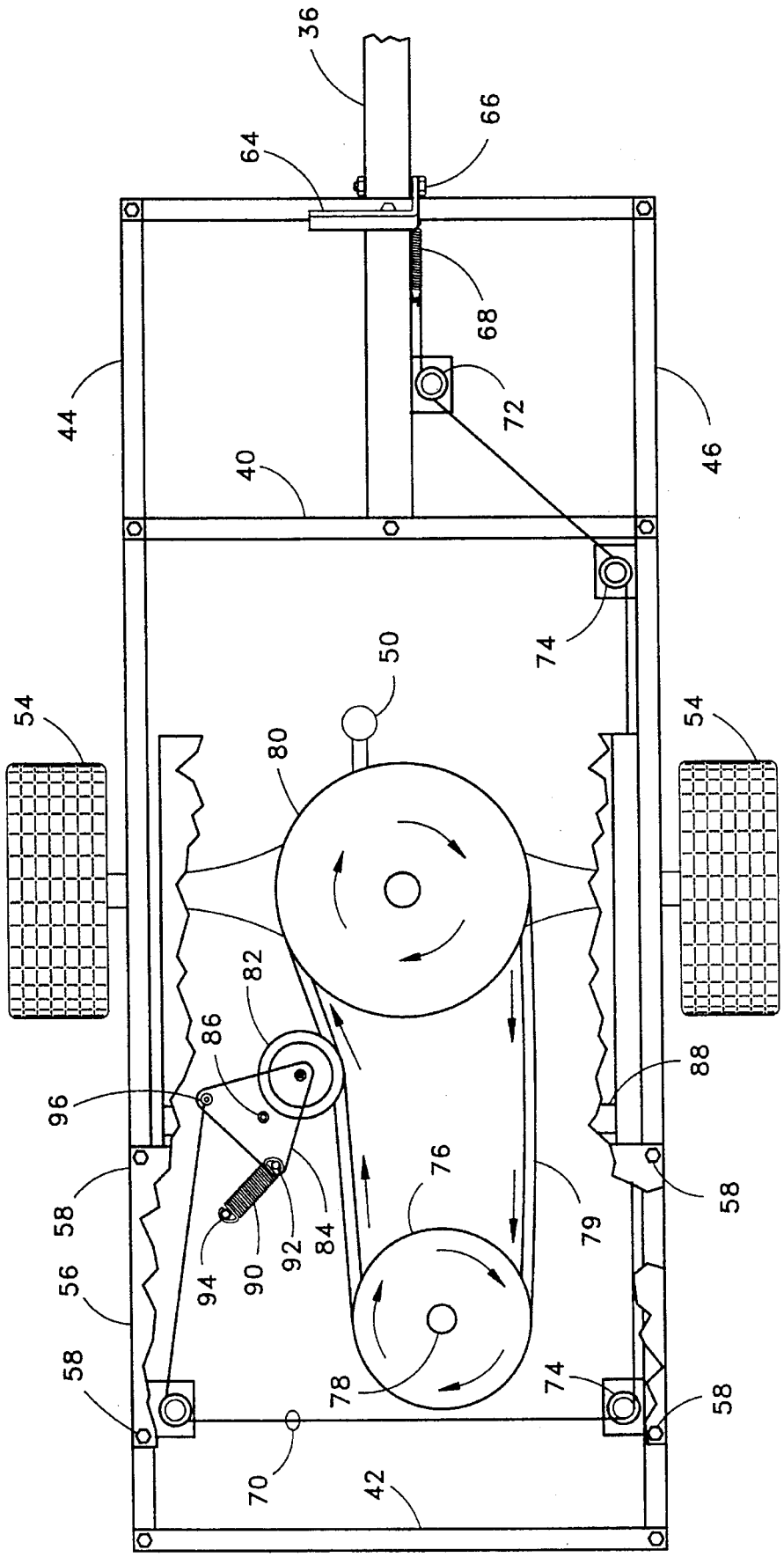
FIG. 2 is a top plan view showing the clutch engaged.
Figure 3:
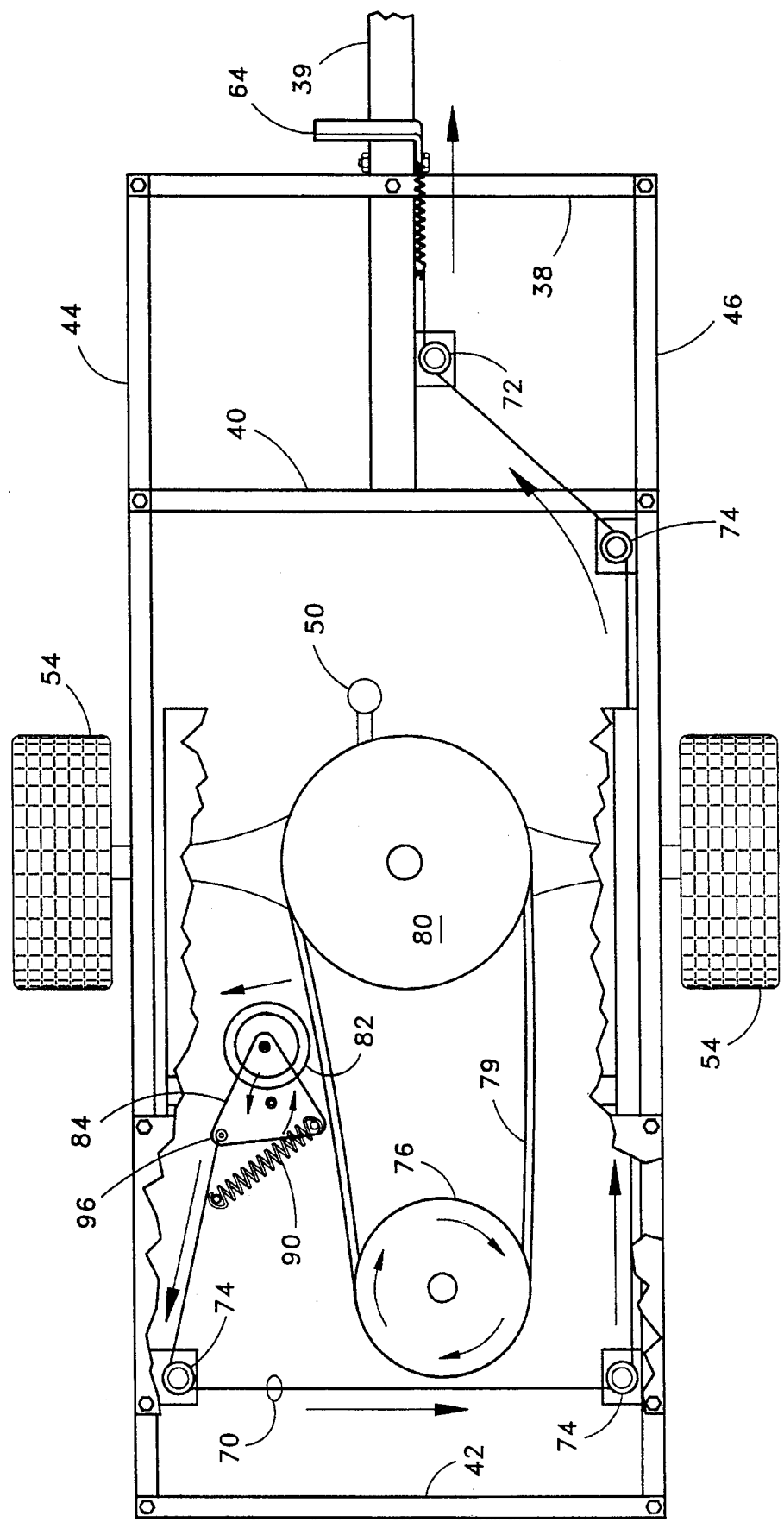
FIG. 3 is a top plan view showing the clutch disengaged.

FIGS. 2 and 3, show a top plan view of the chassis drive system with the motor mounting plate and the operators seat cut away. In the normal operating condition the motor drive pulley 76 is connected to the motor output shaft 78 in a known manner and drives belt 79 in the direction shown by the arrows. The belt in turn rotates the trans axle input pulley 80 causing the wheels 54 to turn. Slack in belt 70 is taken up by the clutch pulley 82 which is attached to triangular plate 84 which is pivotally connected to bolt 86 which is affixed to cross member 88. Expansion spring 90 is connected between a pin at the apex of one angle on the plate 84 and a bolt 94 extending from the motor mounting plate 56. Clutch cable 70 follows the route of the pulleys 74, attaching to the apex 96 of the triangle plate 84. If clutch pedal 64 is depressed as shown in FIG. 3, cable 70 is effectively shortened, turning the plate 84 against the bias of spring 90, lifting the pulley 82 and allowing belt 79 to become slack. This condition allows the belt to slide over pulley 80 without effect, causing the wheels to stop. Reversing the procedure will cause the wheels to again turn.

Figure 4C:
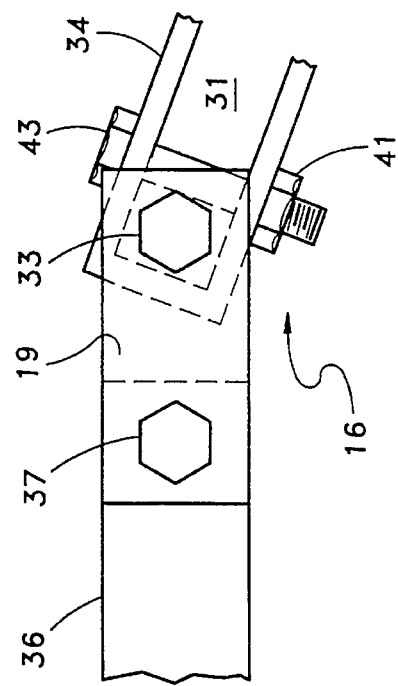
FIGS. 4A, B,C,D are views of the articulated chassis coupling.
Figure 4D:
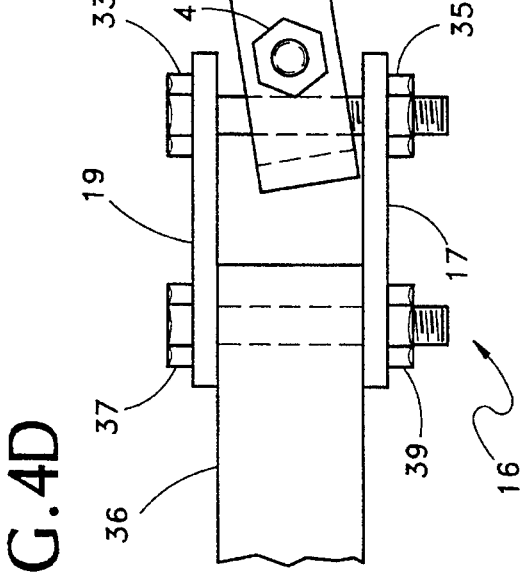
Figure 4A:
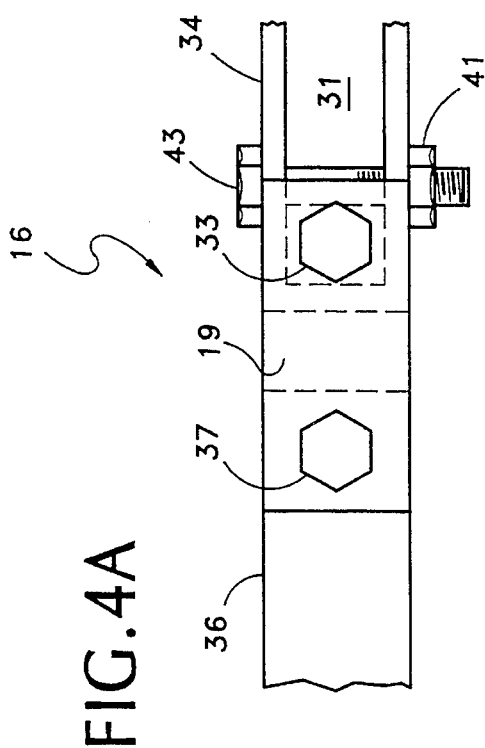
Figure 4B:
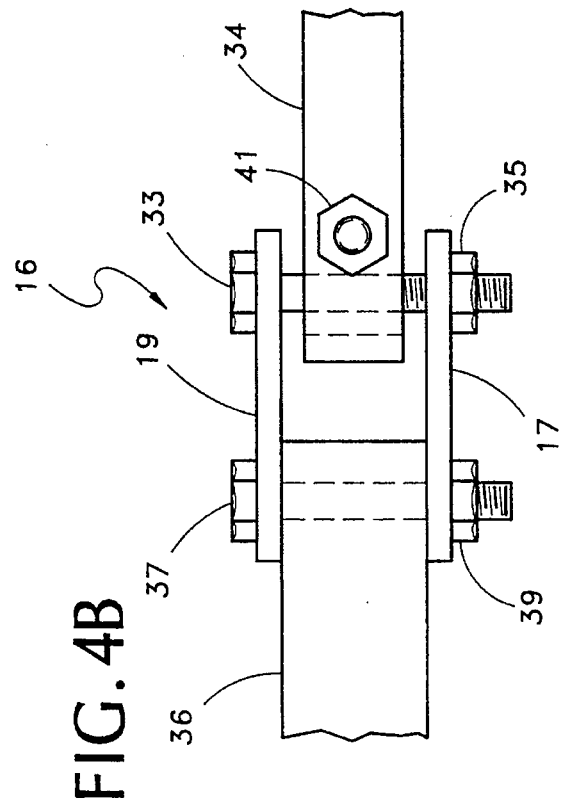

FIGS. 4A and 4C are top plan views of the coupling mechanism 16. FIGS. 4B and 4D are side elevation views of the coupling mechanism 16. Bar 36 is connected to cross members 38 and 40 of the chassis 14 and is formed of tubular steel. Coupler plates 16 and 17 are connected to bar 36 by a single throughgoing bolt 37 which is secured by nut 39. Bar 34 is attached to the tiller frame 22 and contains a slot through which bolt 33 passes acting as a pivot point. The bolt extends through plates 16 and 17 and is secured by nut 35. Bolt 43 is mounted transverse to the axis of bolt 33 and is spaced forward of the bolt across the slot 31. Bolt 43 is secured by nut 41. The coupling as described allows horizontal articulation as shown in FIG. 4C and vertical articulation as shown in FIG. 4D. In addition the coupling allows the chassis to push the tiller forward in the event it becomes bogged down and to restrain the tiller if it moves forward too rapidly.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. An improved garden tiller comprising:
    a tiller section comprising:
        a tiller frame;
        a tiller motor mounted on the tiller frame;
        a set of rotatable soil tilling tines mounted on the tiller frame and operatively attached to the tiller motor;
        a pair of tiller wheels attached to the tiller frame for transporting the tiller;
        a pair of rearward extending handles attached to the tiller frame for controlling the directional operation of the tiller; and
        a rearward extending bar connected to the tiller frame;
        a first means for coupling connected to the rearward extending bar;
        means attached to the pair of rearward extending handles for controlling the operation of the rotatable tines;
    and
    a chassis section comprising:
        a trans axle having a chassis wheel mounted at each end of the trans axle;
        a pulley, for receiving input power, connected to the trans axle;
        a rectangular frame mounted on the trans axle
        a chassis motor mounted on the rectangular frame and operatively connected to the pulley;
        means for controlling the forward movement of the chassis section connected to the rectangular frame;
        the means for controlling the forward movement of the chassis section is a drive belt tension clutch;
        a pedal connected to the rectangular frame and operatively connected to the drive belt tension clutch;
        the drive belt tension clutch is operated by one pedal controlled by a tiller operator;
        a forward extending bar attached to the rectangular frame at a forward potion thereof;
        a second means for coupling connected to the forward extending bar; and
        a seat means for the tiller operator whereby the tiller operator its in the seat means and controls the operation of the tiller section;
        the rearward extending bar from the tiller section includes an elongated slot for providing horizontal and vertical articulation of the tiller section relative to the chassis section;
    the chassis section controls the forward speed of the tiller section through the first and second means for coupling; and
    a vertical and angular articulation member attached to the rearward extending bar to allow vertical and angular articulation of the rearward extending bar and the forward extending bar.

2. An improved garden tiller according to claim 1 wherein the drive belt tension clutch is connected to the pedal by a system of pulleys and a cable.

* * * * *